US012764448B2

(12) United States Patent
Seidel

(10) Patent No.: US 12,764,448 B2
(45) Date of Patent: Oct. 13, 2026

(54) LOUDSPEAKER ARRANGEMENT HAVING A LOUDSPEAKER AND A LIGHTING UNIT

(71) Applicant: MERCEDES-BENZ GROUP AG, Stuttgart (DE)

(72) Inventor: Gerhard Seidel, Beilstein (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 19/102,593

(22) PCT Filed: Jun. 30, 2023

(86) PCT No.: PCT/EP2023/067973
§ 371 (c)(1),
(2) Date: Feb. 10, 2025

(87) PCT Pub. No.: WO2024/032969
PCT Pub. Date: Feb. 15, 2024

(65) Prior Publication Data
US 2026/0143271 A1 May 21, 2026

(30) Foreign Application Priority Data
Aug. 11, 2022 (DE) ..................... 10 2022 002 915.4

(51) Int. Cl.
*H04R 1/02* (2006.01)
*F21V 8/00* (2006.01)
(Continued)

(52) U.S. Cl.
CPC ......... *H04R 1/028* (2013.01); *F21V 33/0056* (2013.01); *G02B 6/002* (2013.01);
(Continued)

(58) Field of Classification Search
CPC .... H04R 1/028; H04R 1/023; H04R 2499/13; F21V 33/0056; G02B 6/002; H05B 45/10;
(Continued)

(56) References Cited

U.S. PATENT DOCUMENTS 9,464,803 B2 * 10/2016 Salter ........................ B60Q 3/64
9,888,321 B2 * 2/2018 Kuribayashi .......... H04R 7/122
(Continued)

FOREIGN PATENT DOCUMENTS

DE 2854799 A1 6/1980
DE 102006005891 A1 8/2007
(Continued)

OTHER PUBLICATIONS

Office Action dated Aug. 19, 2025 in related/corresponding JP Application No. 2025-504451.
(Continued)

*Primary Examiner* — Tsion Tumebo
(74) *Attorney, Agent, or Firm* — PATENT PORTFOLIO BUILDERS PLLC

(57) ABSTRACT

A loudspeaker arrangement includes a loudspeaker and lighting unit. A glass body or a component of the loudspeaker has a visual sign. The lighting unit illuminates the glass body or the component of the loudspeaker to showcase the visual sign using lighting.

14 Claims, 2 Drawing Sheets

Figure 1:
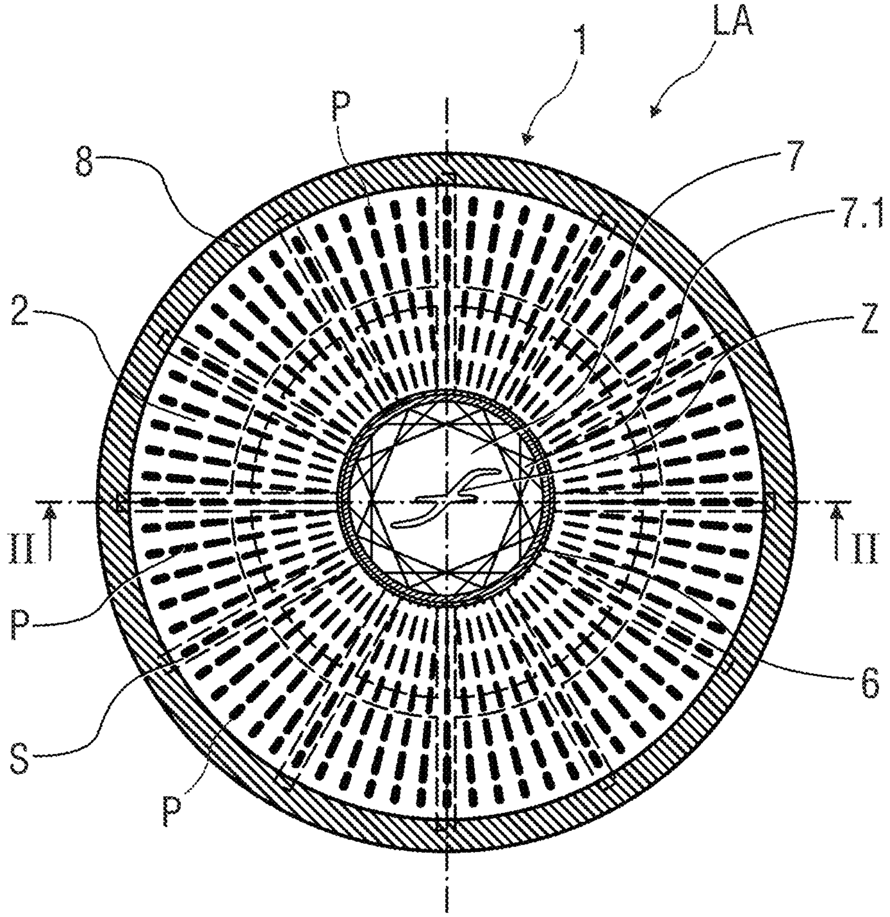

(51) Int. Cl.

| | |
|---|---|
| ***F21V 33/00*** | (2006.01) |
| ***F21W 121/00*** | (2006.01) |
| ***F21Y 115/10*** | (2016.01) |
| ***H05B 45/10*** | (2020.01) |
| ***H05B 45/20*** | (2020.01) |
| ***H05B 47/16*** | (2020.01) |
| *F21W 106/00* | (2018.01) |

(52) U.S. Cl.
CPC ............. *H04R 1/023* (2013.01); *H05B 45/10* (2020.01); *H05B 45/20* (2020.01); *H05B 47/16* (2020.01); *F21W 2106/00* (2018.01); *F21W 2121/00* (2013.01); *F21Y 2115/10* (2016.08); *H04R 2499/13* (2013.01)

(58) Field of Classification Search
CPC .... H05B 45/20; H05B 47/16; F21W 2106/00; F21W 2121/00; F21Y 2115/10
See application file for complete search history.

(56) References Cited

U.S. PATENT DOCUMENTS

| | | | | |
|---|---|---|---|---|
| 10,681,438 | B2 * | 6/2020 | Bech | H04R 1/2803 |
| 11,384,931 | B2 * | 7/2022 | Warren | F21V 23/003 |
| 2002/0079208 | A1 * | 6/2002 | Campana | H01H 13/023 200/310 |
| 2006/0060415 | A1 | 3/2006 | Radu et al. | |
| 2010/0316247 | A1 * | 12/2010 | Ding | G08B 7/066 381/397 |
| 2012/0168288 | A1 * | 7/2012 | Furrer | H01H 13/06 200/61.58 R |
| 2016/0205477 | A1 | 7/2016 | Kuribayashi et al. | |
| 2016/0286318 | A1 * | 9/2016 | Yuasa | H04R 7/125 |
| 2018/0035187 | A1 * | 2/2018 | Cook | F21V 33/0056 |
| 2019/0281374 | A1 * | 9/2019 | Proni | H04R 7/16 |
| 2021/0094479 | A1 * | 4/2021 | Barrow | H04R 1/025 |
| 2021/0164645 | A1 * | 6/2021 | Warren | F21V 5/046 |
| 2023/0105804 | A1 | 4/2023 | Mao et al. | |

FOREIGN PATENT DOCUMENTS

| | | | |
|---|---|---|---|
| DE | 202016006556 | U1 | 11/2016 |
| DE | 102016122078 | A1 | 6/2017 |
| DE | 102016115750 | A1 | 3/2018 |
| DE | 202019106273 | U1 | 12/2019 |
| DE | 102020003925 | A1 | 8/2020 |
| JP | 2000115869 | A | 4/2000 |
| JP | 2007318611 | A | 12/2007 |
| JP | 2010027845 | A | 2/2010 |
| JP | 2010057092 | A | 3/2010 |
| WO | 2021138969 | A1 | 7/2021 |

OTHER PUBLICATIONS

International Search Report and Written Opinion mailed Sep. 26, 2023 in related/corresponding International Application No. PCT/EP2023/067973.

Office Action created Mar. 6, 2023 in related/corresponding DE Application No. 10 2022 002 915.4.

* cited by examiner

LOUDSPEAKER ARRANGEMENT HAVING A LOUDSPEAKER AND A LIGHTING UNIT

BACKGROUND AND SUMMARY OF THE INVENTION

Exemplary embodiments of the invention relates to loudspeaker arrangement having a loudspeaker and a lighting unit.

An illuminated loudspeaker is known from DE 10 2016 122 078A 1 , which contains a light source configured to emit input light. A diaphragm is configured to move when a magnet receives electrical signals. First and second photoluminescent structures are arranged on the diaphragm. The input light emitted by the light source is converted by the first and the second photoluminescent structure into output light.

DE 10 2016 115 750 A 1 describes a lighting element for an interior of a motor vehicle, having an elongated light guide, a diffuser, wherein the light guide is at least partially received in the diffuser, and having a reflector. The reflector is arranged on an inner side of the diffuser and has a reflecting surface which is facing towards the light guide. The reflector is designed to reflect light from the light guide to an outer side of the light guide, wherein the reflector has a rough surface in order to diffusely reflect light from the light guide.

Furthermore, DE 20 2016 006 556 U 1 discloses a drinking glass of any shape and/or color, into the interior of which, i.e., where the drinks are poured, a two-or three-dimensional sculpture is permanently incorporated.

Exemplary embodiments of the invention are directed to a novel loudspeaker arrangement having a loudspeaker and a lighting unit.

A loudspeaker arrangement has a loudspeaker and a lighting unit. According to the invention, a glass body and/or a component of the loudspeaker has or have a visual sign and the lighting unit illuminates the glass body and/or the component of the loudspeaker in order to showcase the visual sign using lighting.

By means of a loudspeaker arrangement designed in such a way, it is possible to illuminate the visual sign and therefore optically highlight it. By means of the visual sign, which can be a trademark and/or represent a product, the brand and/or the product can be presented in a visually appealing way and form a focal point of the loudspeaker arrangement.

In this case, direct or indirect illumination, in particular of the visual sign, is integrated as an additional function into the loudspeaker cover as an assembly.

In one embodiment, a support structure formed at least in sections from a transparent and/or translucent material is arranged on a rear side of a loudspeaker cover, which support structure has a plurality of light decoupling structures. In particular, the visual sign is arranged in relation to at least one of the light decoupling structures in such a way that the visual sign is showcased by means of direct or indirect illumination. In this case, the loudspeaker cover can be formed as a grating, in particular a metal grating, whereby a diaphragm of the loudspeaker is arranged in particular protected from mechanical damage.

In a further development of the loudspeaker arrangement, the lighting unit has a light guide element surrounding the edge of the support structure and has at least one light coupling element, and the light guide element is coupled to the at least one light coupling element. This design of the lighting unit makes it comparatively inexpensive, wherein the appearance of the loudspeaker arrangement can be enhanced by means of the lighting unit.

In one embodiment, a diffuser is arranged on the support structure as a component with the glass body arranged in a holder. The visual sign can alternatively or additionally be arranged on the diffuser, wherein the visual sign is also showcased using lighting by means of the lighting unit.

In one development of the loudspeaker arrangement, light coupled into the light guide element and emitted by means of the at least one light coupling element emerges directly or indirectly via the light decoupling structures of the support structure, a perforation of the loudspeaker cover, in a region of the glass body and/or via the glass body for the showcasing using lighting.

In a further development, the visual sign is arranged on an underside of the glass body, on an upper side of the glass body and/or in an interior of the glass body and is formed by means of printing, foil, indentation, embossing and/or matte finishing.

If the visual sign is arranged on the underside of the glass body, the visual sign is arranged protected as far as possible against dirt and dust deposits. If the visual sign is, alternatively or additionally, arranged on the upper side of the glass body, it is possible in particular to change the visual sign, for example by removing and/or gluing over it. A user of the loudspeaker arrangement or an owner of a vehicle in which the loudspeaker arrangement is arranged thus has the option to change the visual sign as required. This makes it possible to customize the loudspeaker cover, for example by using the initials of the user, i.e., the owner of the loudspeaker, to form the visual sign showcased using lighting.

If it is provided that the visual sign, alternatively or additionally, is formed in the interior of the glass body, the visual sign can also have a three-dimensional form, which is then illuminated directly or indirectly by means of the lighting unit for the showcasing effect using lighting.

In a further, alternative or additional, embodiment of the loudspeaker arrangement, the visual sign is arranged on an upper side of the diffuser as a component of the loudspeaker and is formed by means of printing, foil, indentation, embossing, and/or matte finishing. Also, in this embodiment, the visual sign is arranged protected from dirt, as the holder having the glass body is arranged on the diffuser and the glass body is arranged on the upper side of the diffuser.

In a further development of the loudspeaker arrangement, the diffuser and/or the glass body arranged thereon is or are coupled to a light source and/or a separate light guide for light coupling. This makes it possible to create different illumination areas and if necessary to use different colored light sources as light coupling elements.

In one embodiment of the loudspeaker arrangement, the transparent and/or translucent sections of the support structure are arranged in such a way that the coupled light exclusively emerges directly or indirectly via the glass body of the loudspeaker arrangement. Since the light only emerges via the glass body in this embodiment, the visual sign can be the one and only focal point and attract the attention of an observer.

Furthermore, a possible embodiment provides that the light coupling element is coupled to a control unit for switching the at least one light coupling element on and off, for controlling a brightness, a color and/or a frequency of the emitted light. As a result, different colors and/or lighting effects can be created, which again form a focal point and enhance the appearance of the loudspeaker arrangement, in particular the loudspeaker cover.

Furthermore, exemplary embodiments of the invention relate to a vehicle having such a loudspeaker arrangement, which has the loudspeaker and the loudspeaker cover, and the loudspeaker cover is designed as described above and which can be customized by means of the visual sign. If the loudspeaker is arranged with the loudspeaker cover in a door inside trim of a vehicle door, the direct and/or indirect emergence of light can also be used for comparatively subtle illumination of an area where people get in and out of the vehicle. For example, the light emergence can be controlled accordingly for illumination.

BRIEF DESCRIPTION OF THE DRAWING FIGURES

Exemplary embodiments of the invention are explained in more detail in the following using the drawings.

Figure 2:
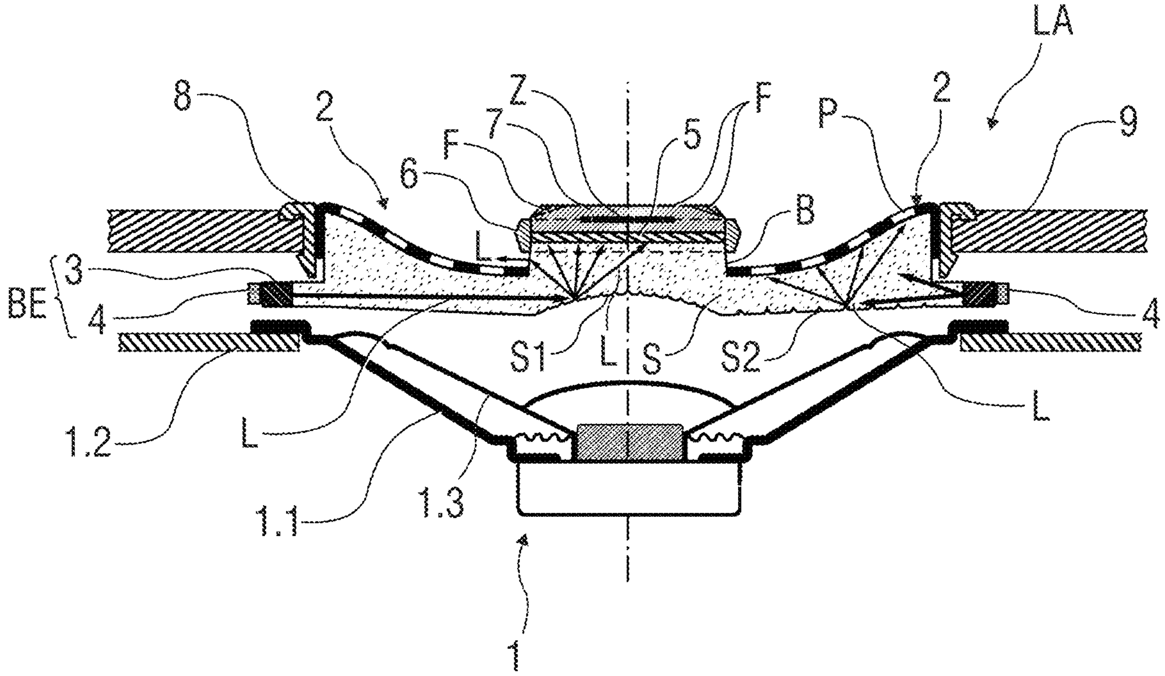

Here:

FIG. 1 schematically shows a front view of a loudspeaker arrangement having a loudspeaker and a loudspeaker cover and FIG. 2 schematically shows a sectional representation of the loudspeaker arrangement having the loudspeaker and the loudspeaker cover.

Parts corresponding to each other are provided with the same reference signs in all the figures.

DETAILED DESCRIPTION

FIG. 1 shows a front view of a loudspeaker arrangement LA having a loudspeaker 1 and a loudspeaker cover 2 and FIG. 2 shows a sectional representation of the loudspeaker arrangement LA having the loudspeaker 1 and the loudspeaker cover 2. The loudspeaker 1 and the loudspeaker cover 2 are arranged in particular in a vehicle, for example in a door inside trim of a vehicle door. The loudspeaker 1 and the loudspeaker cover 2 each have a circular shape.

The loudspeaker 1 has a so-called loudspeaker basket 1.1, a carrier structure 1.2, and a loudspeaker diaphragm 1.3 which is arranged protected, in particular from mechanical damage, by means of the loudspeaker cover 2.

The loudspeaker cover 2, which is directed in particular towards a vehicle interior space, often also has a decorative, i.e., creative, function in addition to a cover and protection function for the loudspeaker diaphragm 1.3. A plurality of light functions are known, wherein these light functions frame the loudspeaker cover or shine through the loudspeaker cover.

The loudspeaker cover 2 described below has, in addition to a protection and cover function of the loudspeaker 1, an illumination function realized by means of a lighting unit BE, having a visual sign Z, for example for customization. If the loudspeaker 1 is arranged in a door inside trim of the vehicle, the lighting unit BE can be used, for example, also for illuminating an area of the vehicle door where people get in and out of the vehicle.

In one possible embodiment, the loudspeaker cover 2 is formed as a grating, in particular from a comparatively thin metal sheet with perforations P, which is stabilized against mechanical influences by means of a support structure S arranged on a rear side.

The support structure S is formed from a transparent and/or translucent material. In an alternative embodiment, the support structure S has sections at specified positions, which are formed from a transparent and/or translucent material.

A light guide element 3, i.e., a ring-shaped light guide element 3 as a component of the lighting unit BE, is arranged on the support structure S, surrounding it at the edge, and is coupled to 2 light coupling elements 4, i.e., 2 light sources as further components of the lighting unit BE, for example in the form of LEDs. The number of light coupling elements 4 can vary, so that one light coupling element 4 or several light coupling elements 4 can also be provided.

In the center of the loudspeaker cover 2, a diffuser 5 is arranged on the support structure S, which evenly scatters light L coupled into the support structure S. For this purpose, the support structure S has a number of light decoupling structures S1, S2, wherein light L decoupled via a light decoupling structure S1 is evenly scattered by means of the diffuser 5.

A holder 6, in particular a socket, is arranged on the diffuser 5, wherein a glass body 7 is arranged in the holder 6 in such a way that the diffuser 5 is arranged on an underside of the glass body 7. The holder 6 encloses the diffuser 5 and the glass body 7 at the edge, so that the diffuser 5 and the glass body 7 are arranged directly on each other. In particular, the glass body 7 is encased by means of the holder 6 like a jewel.

The glass body 7, alternatively a crystal, is fixed integrally, in a form-fitting manner and/or frictionally to the diffuser 5 and the holder 6 on the support structure S and/or the light guide element 3, for example glued and/or clipped onto the support structure S.

The glass body 7 and/or the diffuser 5 has a visual sign Z, which is also referred to as a signet. According to the exemplary embodiment shown in FIG. 1 and 2, the glass body 7 has the visual sign Z, which is introduced into the glass body 7, i.e., is formed in the interior of the glass body 7.

The visual sign Z is formed by means of printing, foil, indentation, embossing, and/or matte finishing in the interior of the glass body 7, wherein the visual sign Z can also have a three-dimensional form. For example, the visual sign Z may be a logo, a trademark and/or an initial of a vehicle owner, so that a customization level of the vehicle is enhanced.

In particular, the visual sign Z is introduced into the glass body 7 using a laser and can be formed three-dimensionally. Alternatively or additionally, the glass body 7 can be formed in two parts, so that the visual sign Z is applied or introduced onto and/or into one part and/or onto and/or into the other part of the two-part glass body 7 by means of one or more of the methods of introduction listed above.

In order to particularly emphasize the visual sign Z and draw attention to the visual sign Z, the edges and/or surfaces of the glass body 7 can be ground like a crystal or a diamond, particularly if the glass body 7 is made of real glass. If the glass body 7 is made of acrylic glass, the edges and/or surfaces can be molded, wherein the edges and/or surfaces refract a light L according to an effect to be achieved.

According to the present exemplary embodiment in FIGS. 1 and 2, the glass body 7 has ground surfaces F, in other words facets, in its peripheral edge area 7.1.

In a first alternative or additional embodiment, the visual sign Z is arranged on the underside of the glass body 7 and formed by means of printing, foil, for example chrome foil, indentation, embossing, and/or matte finishing, for example by means of laser radiation, mechanical processing, and/or matte finishing using a mold. Different types of application can also be combined with each other, with, for example, an indentation with subsequent matte finishing being conceivable.

In a second alternative or additional embodiment, the visual sign Z is arranged on an upper side of the glass body 7 and formed by means of printing, foil, for example chrome foil, indentation, embossing, and/or matte finishing. Here too, any useful combination of the various types of application is possible.

In a third alternative or additional embodiment, the visual sign Z is arranged on an upper side or an underside of the diffuser 5 and is formed in particular by means of the types of application listed above.

The glass body 7 is emphasized and illuminated by means of emitted light L from the lighting unit BE, in particular the light coupling elements 4 in the form of LEDs and the ring-shaped light guide element 3 as well as the light decoupling structures S1, S2. The light L decoupled via the light decoupling structure 3.1 is evenly scattered by the diffuser 5 and is refracted on the visual sign Z.

Using different lighting scenarios in relation to the glass body 7 and the light effects on the visual sign Z, different effects can be achieved depending on the design.

For example, a lighting scenario comprises switch-on and switch-off scenarios as well as at least one dimming function.

In an alternative or additional development, cold white or warm white light L can be emitted, a color change can be generated and/or the emitted light L can be pulsed in a lighting scenario by means of the light coupling element 4 or by means of several light coupling elements 4. For example, the light coupling element 4 is or the light coupling elements 4 are connected to a control unit, which is not shown in detail, in order to set the various light scenarios.

If 2 or more light coupling elements 4 are provided, special light effects, for example light and/or color transitions and a sparkle can be produced on the ground surfaces F of the glass body 7 and/or on the visual sign Z.

Light decoupling, i.e., light emission and a light effect, occurs directly via a surface of the glass body 7 with the ground surfaces F and/or in a transparent area B between the loudspeaker cover 2, i.e., the perforated metal sheet and the holder 6 of the glass body 7. As a result, light L passes through the perforation P of the loudspeaker cover 2 into an adjacent external area.

The loudspeaker cover 2 is additionally illuminated from a visible side by indirect lighting in the transparent area B around the glass body 7. This can enhance a floating effect of the glass body 7 and the holder 6.

The light coupling element 4 or the light coupling elements 4 can be controlled in such a way that entry and exit scenarios in relation to the vehicle, display options, for example with regard to warning functions, comfort displays, for example warm/cold, ambient lighting functions, mood lighting scenarios, and/or visual sound support can be displayed.

If the loudspeaker arrangement LA with the loudspeaker 1 and the loudspeaker cover 2 is arranged on an inner side of a vehicle door or at least partially integrated into it, then the loudspeaker cover 2 is arranged and fastened by means of a frame 8 to a housing 9 formed by a door lining, a baffle, etc.

By showcasing and emphasizing the visual sign Z, the appearance of the loudspeaker 1 with the loudspeaker cover 2 can be embossed and enhanced.

Additional functions and/or moods can be bundled and integrated into the loudspeaker cover 2 at relatively low cost.

In one alternative embodiment, the transparent and/or translucent sections of the support structure S, i.e., their decoupling structures S1, S2, are arranged in such a way that the coupled light L emerges exclusively directly or indirectly via the glass body 7. For example, the support structure S is provided, at least in sections, with an opaque coating, with a separate opaque part, and/or with an opaque 2-component part. This can prevent light from emerging in the area of the loudspeaker cover 2, i.e., in the area of the perforated metal sheet.

In an alternative design of the loudspeaker cover 2, the glass body 7 is illuminated through the diffuser 5 by means of a light source (not shown in detail) or several light sources. The light source is or the light sources are arranged in relation to the diffuser 5 in such a way that a light L is coupled from an underside of the diffuser 5 through the latter into the glass body 7.

Alternatively or additionally, it may also be provided that the glass body 7 is illuminated from an underside by means of a separate light guide element (not shown in detail).

A separate light guide element can also be arranged around the glass body 2 and illuminate it, with a light decoupling surface extending over the entire extent of the separate light guide element.

The loudspeaker arrangement LA with the loudspeaker 1 and the loudspeaker cover 2 with the directly and/or indirectly illuminated glass body 7, which can have the visual sign Z, is not only provided for arrangement in a vehicle. The loudspeaker 1 with the loudspeaker cover 2 can also be arranged in all conceivable indoor and outdoor areas.

An overall appearance of the loudspeaker arrangement LA can be customized in various ways and feature all conceivable visual signs Z, for example in the form of trademarks and/or product symbols, as focal points.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A loudspeaker arrangement comprising:

a loudspeaker;

a loudspeaker cover comprising a glass body, wherein the loudspeaker is arranged behind the loudspeaker cover and faces a rear side of the loudspeaker cover;

a diffuser arranged between the loudspeaker and the glass body, wherein the diffuser or the glass body has a visual sign;

a support structure, formed at least in sections from a transparent or translucent material, arranged on the rear side of the loudspeaker cover, wherein the support structure is configured to stabilize the loudspeaker cover against mechanical influences and has a plurality of light decoupling structures; and a lighting unit comprising a light quide element surrounding an edge of the support structure and at least one light coupling element coupled to the light quide element, wherein the lighting unit is configured to illuminate, using lighting, the glass body or the diffuser to showcase the visual sign, and wherein the light coupled into the light guide element and emitted by the at least one light coupling element emerges directly or indirectly, via the plurality of light decoupling structures of the support structure, in a region of the glass body or via the glass body.

2. The loudspeaker arrangement of claim 1, wherein the visual sign is arranged on an underside of the glass body, on an upper side of the glass body, or in an interior of the glass body and the visual sign is formed printing, foil, indentation, embossing, or matte finishing.

3. The loudspeaker arrangement of claim 1, wherein the visual sign is arranged on an upper side of the diffuser and the visual sign is formed by printing, foil, indentation, embossing, or matte finishing.

4. The loudspeaker arrangement of claim 1, wherein the sections formed from the transparent or translucent material of the support structure are arranged in such a way that coupled light exclusively emerges directly or indirectly via the glass body of the loudspeaker cover.

5. The loudspeaker arrangement of claim 1, wherein the light coupling element is coupled to a control unit configured to switch the at least one light coupling element on and off, or to control a brightness, a color, or a frequency of emitted light.

6. The loudspeaker arrangement of claim 1, wherein the glass body is arranged in a holder arranged on the diffuser.

7. The loudspeaker arrangement of claim 1, wherein the light emitted by the at least one light coupling element and coupled to the light guide element exits directly or indirectly via a perforation of the loudspeaker cover.

8. A vehicle comprising:

a loudspeaker arrangement, which comprises a loudspeaker;

a loudspeaker cover comprising a glass body, wherein the loudspeaker is arranged behind the loudspeaker cover and faces a rear side of the loudspeaker cover;

a diffuser arranged between the loudspeaker and the glass body, wherein the diffuser or the glass body has a visual sign;

a support structure, formed at least in sections from a transparent or translucent material, arranged on the rear side of the loudspeaker cover, wherein the support structure is configured to stabilize the loudspeaker cover against mechanical influences and has a plurality of light decoupling structures; and a lighting unit comprising a light quide element surrounding an edge of the support structure and at least one light coupling element coupled to the light guide element, wherein the lighting unit is configured to illuminate, using lighting, the glass body or the diffuser to showcase the visual sign, and wherein the light coupled into the light quide element and emitted by the at least one light coupling element emerges directly or indirectly, via the plurality of light decoupling structures of the support structure, in a region of the glass body or via the glass body.

9. The vehicle of claim 8, wherein the visual sign is arranged on an underside of the glass body, on an upper side of the glass body, or in an interior of the glass body and the visual sign is formed printing, foil, indentation, embossing, or matte finishing.

10. The vehicle of claim 8, wherein the visual sign is arranged on an upper side of the diffuser and the visual sign is formed by printing, foil, indentation, embossing, or matte finishing.

11. The vehicle of claim 8, wherein the sections formed from the transparent or translucent material of the support structure are arranged in such a way that coupled light exclusively emerges directly or indirectly via the glass body of the loudspeaker cover.

12. The vehicle of claim 8, wherein the light coupling element is coupled to a control unit configured to switch the at least one light coupling element on and off, or to control a brightness, a color, or a frequency of emitted light.

13. The vehicle of claim 8, wherein the glass body is arranged in a holder arranged on the diffuser.

14. The vehicle of claim 8, wherein the light emitted by the at least one light coupling element and coupled to the light guide element exits directly or indirectly via a perforation of the loudspeaker cover.

* * * * *